(12) United States Patent
Sternberger

(10) Patent No.: US 6,557,799 B1
(45) Date of Patent: May 6, 2003

(54) ACOUSTIC TREATED THRUST REVERSER BULLNOSE FAIRING ASSEMBLY

(75) Inventor: Joe E. Sternberger, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/035,964

(22) Filed: Nov. 9, 2001

(51) Int. Cl.$^7$ ................................................ F02K 3/02
(52) U.S. Cl. .................... 244/110 B; 244/1 N; 60/226.2
(58) Field of Search ............................ 244/110 B, 1 N, 244/53 R, 62; 60/226.2; 239/265.29, 265.27, 265.31, 265.19

(56) References Cited

U.S. PATENT DOCUMENTS

| | | | | |
|---|---|---|---|---|
| 3,541,794 A | * | 11/1970 | Johnston et al. | ........ 239/265.29 |
| 3,890,060 A | | 6/1975 | Lipstein | ...................... 415/119 |
| 4,122,672 A | | 10/1978 | Lowrie | ..................... 60/226 R |
| 4,421,201 A | * | 12/1983 | Nelsen et al. | ................ 181/214 |
| 4,759,513 A | | 7/1988 | Birbragher | ................. 244/1 N |
| 4,998,409 A | * | 3/1991 | Mutch | ................. 239/265.29 |
| 5,060,471 A | | 10/1991 | Torkelson | .................... 60/262 |
| 5,101,621 A | | 4/1992 | Mutch | ....................... 60/226.1 |
| 5,251,435 A | | 10/1993 | Pauley | ....................... 60/226.1 |
| 5,782,082 A | | 7/1998 | Hogeboom et al. | ......... 60/226.1 |
| 5,806,302 A | * | 9/1998 | Cariola et al. | ......... 239/265.29 |
| 5,927,647 A | * | 7/1999 | Masters et al. | ......... 239/265.19 |
| 5,975,237 A | | 11/1999 | Welch et al. | ................ 181/290 |
| 6,170,254 B1 | * | 1/2001 | Cariola | .................... 244/110 B |
| 6,385,964 B2 | * | 5/2002 | Jean et al. | ............. 239/265.29 |
| 6,440,521 B1 | * | 8/2002 | Moore | ........................ 123/41.7 |
| 2001/0048048 A1 | * | 12/2001 | Riedel et al. | ............. 244/53 B |

* cited by examiner

Primary Examiner—Michael J. Carone
Assistant Examiner—Gabriel Sukman
(74) Attorney, Agent, or Firm—Larry N. Ginsberg

(57) ABSTRACT

An acoustically treated bullnose fairing assembly for a thrust reverser of an aircraft, the thrust reverser having an outer fixed structure and a stowable blocker door. The bullnose fairing assembly includes a back sheet, a face sheet and a honeycomb structure positioned between the face sheet and the back sheet—these three items being bonded together and securely affixed to an outer fixed structure of the thrust reverser. The back sheet has a forward end and a back end. The face sheet has a forward portion and a back portion, the back portion being aft of a forward edge of the blocker door when the blocker door is stowed. The forward portion of the face sheet is perforated. The perforated forward portion of the face sheet cooperates with the honeycomb structure to maximize the acoustic performance of the thrust reverser.

29 Claims, 2 Drawing Sheets

ACOUSTIC TREATED THRUST REVERSER BULLNOSE FAIRING ASSEMBLY

BACKGROUND OF THE INVENTION

1. Field of the Invention

This invention relates to the attenuation of aircraft jet engine sound frequencies and more particularly to a bullnose fairing assembly for installation in an aircraft thrust reverser.

2. Description of the Related Art

Aircraft engine noise is a significant problem in high population areas and other noise controlled environments. To mitigate this problem efforts have focused on lining the aircraft nacelle and surrounding engine areas with acoustic liners to reduce the amount of noise radiating to the community.

U.S. Pat. No. 4,421,201, issued to M. D. Nelson et al, discloses a broadband acoustic resonator and absorption panel used for reducing engine noise from high bypass fan jet engines mounted on an aircraft.

U.S. Pat. No. 5,782,082, issued to Hogeboom et al, discloses an aircraft engine acoustic liner for use in dissipating low mode order noise. The low resistance liner includes a middle layer, having partitioned cavities. The cavities aid in scattering a large amount of low mode order noise into higher mode order noise. An imperforate sheet is attached to one side of the middle layer. A perforate sheet having a large open surface area is optionally attached to the middle layer. The perforate sheet stops the whistling effect caused by high speed air flowing into the cavities and minimizes airflow drag.

U.S. Pat. No. 4,122,672, issued to Lowrie et al, discloses an acoustic liner that forms part of the fan duct wall near the blade tips and combats the degeneration by reinforcing the regular shockwave pattern at the expense of the irregular one. This is achieved by making the cells equal to half the wavelength of the blade passing frequency at the predetermined supersonic condition of interest.

U.S. Pat. No. 5,975,237, issued to Welch et al discloses a reinforcing structure for an engine nacelle acoustic panel that is used for a thrust reverser panel. However, the bullnose fairing is not acoustically protected.

None of the aforementioned references address the acoustic treatment of a bullnose fairing of a thrust reverser.

SUMMARY

The present invention is an acoustically treated bullnose fairing assembly for a thrust reverser of an aircraft, the thrust reverser having an outer fixed structure and a stowable blocker door. The bullnose fairing assembly includes a back sheet, a face sheet and a honeycomb structure positioned between the face sheet and the back sheet—these three items being bonded together and securely affixed to an outer fixed structure of the thrust reverser. The back sheet has a forward end and a back end. The face sheet has a forward portion and a back portion, the back portion being aft of a forward edge of the blocker door when the blocker door is stowed. The forward portion of the face sheet is perforated. The perforated forward portion of the face sheet cooperates with the honeycomb structure to maximize the acoustic performance of the thrust reverser. This added acoustic capability provided to the treated bullnose fairing assembly can increase the total acoustic area of the thrust reverser by approximately 5 percent, depending on the diameter and length of the thrust reverser.

The back sheet is preferably affixed to the thrust reverser by a set of forward fastening elements that fasten the backsheet to a forward portion of an outer fixed structure of the thrust reverser. The forward fastening elements are blind fasteners that do not extend through the bullnose fairing assembly to the face sheet.

DETAILED DESCRIPTION OF THE INVENTION

Figure 1:
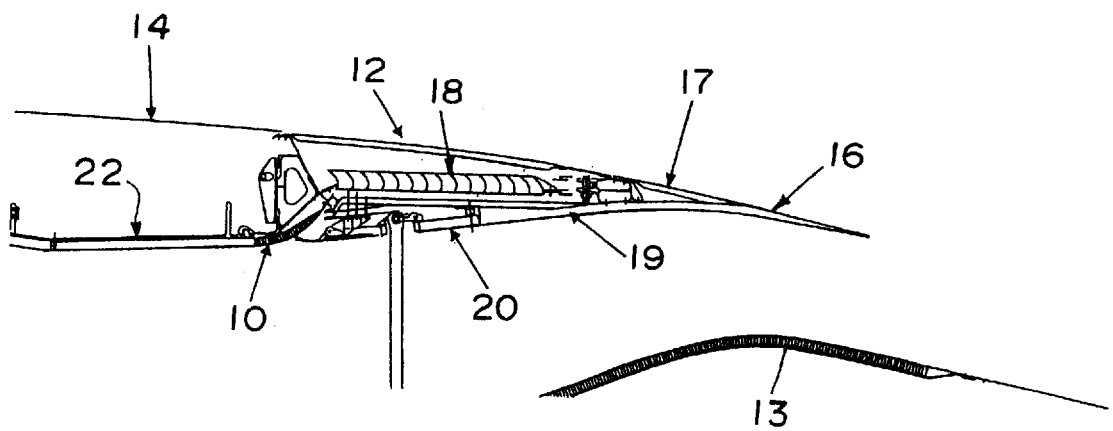
FIG. 1 is a side elevation illustrating a portion of an aircraft about its thrust reverser, with parts broken away for illustrative purposes, showing a preferred embodiment of the bullnose fairing assembly of the present invention.

Referring to the drawings and the characters of reference marked thereon FIG. 1 illustrates a preferred embodiment of the acoustically treated bullnose fairing assembly of the present invention, designated generally as 10, installed in a thrust reverser 12 of a nacelle 14 of an aircraft. The thrust reverser has a fore-and-aft translating sleeve 16 to cover or expose thrust reverser cascades 18 when deploying thrust reverser blocker doors 20 carried on the translating sleeve 16 and linked to a thrust reverser inner wall 13. The thrust reverser assembly is positioned just aft of a jet engine 22 as is used on an airplane. The thrust reverser assembly is fitted within the nacelle 14. The thrust reverser cascades 18 are circumferentially spaced around the interior of the nacelle 14.

During normal flying operations the translating sleeve 16 is in a closed, or forward, position to cover the thrust reverser cascades 18. For landing an airplane, the translating sleeve 16 is moved from the closed position to the rearwardly extended, or deployed, position by means of actuator rods (not shown). This positioning routes engine high by-pass fan air to flow through the thrust reverser cascades 18 so as to slow down the aircraft on the ground. Engine high by-pass fan air is rerouted through the thrust reverser cascades 18 by closing the circumferentially positioned blocker doors 20.

The translating sleeve 16 is usually formed from a pair of semi-cylindrical outer cowl panels 17 and a pair of semi-cylindrical inner acoustic panels 19 attached together to form the aft portion of the cylindrical nacelle 14. The outer cowl and acoustic panels are attached at their aft ends and branch or diverge to provide a chamber for containing and concealing the thrust reverser cascades 18 and the associated support structures.

When the translating sleeve 16 is in the stowed position shown, the leading ends of the acoustic panel 19 and the outer cowl panel 17 extend on opposite sides of the thrust reverser cascades. 18. When the thrust reverser is deployed, the translating sleeve 16 is moved aft to expose the cascades 18. The fan duct blocker doors 20 at the forward end of the acoustic panel 19 are deployed to divert fan flow through the cascades 18.

Figure 2:
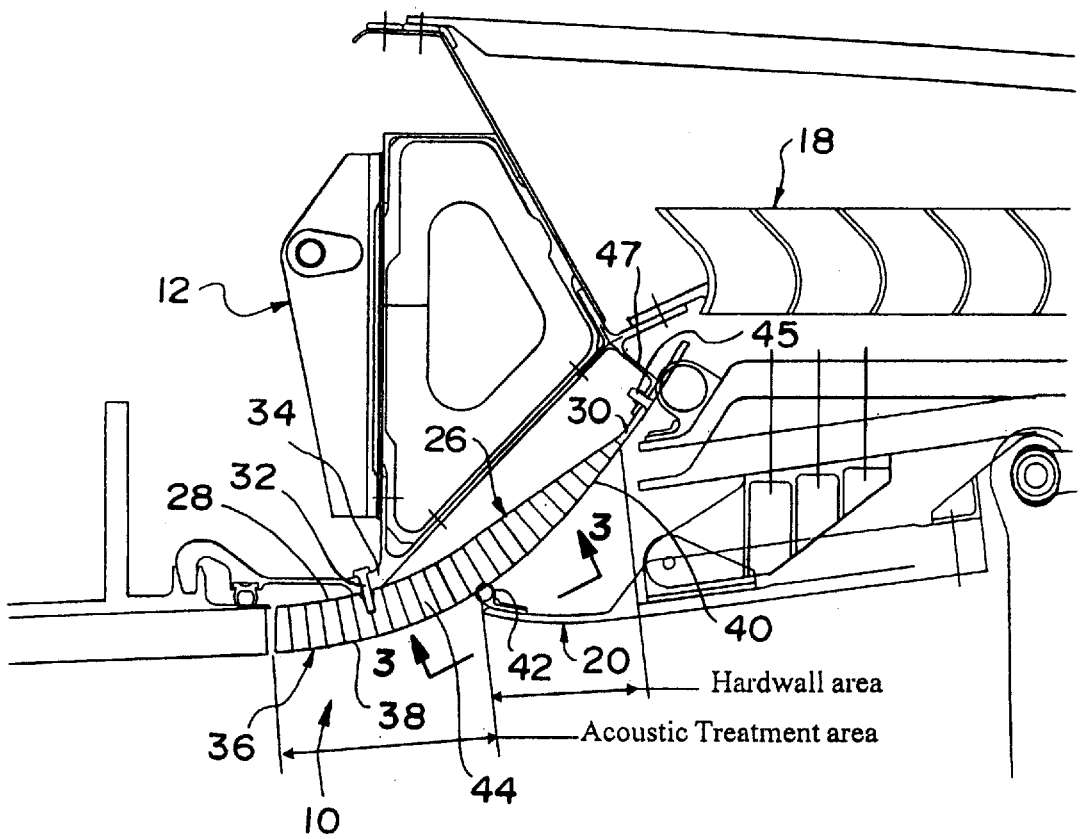
FIG. 2 is an enlarged side elevation showing the bullnose fairing assembly.

Referring now to FIG. 2, the acoustically treated bullnose fairing assembly 10 of the present invention includes a back sheet 26 having a forward end 28 and a back end 30. A row of forward fastening elements 32 fasten the back sheet 26 to a forward portion of an outer fixed structure 34 the thrust reverser 12. A face sheet 36 includes a forward portion 38 and a back portion 40. The forward fastening elements 32 are preferably blind fasteners that do not extend through the bullnose fairing assembly 10 to the face sheet 36.

The forward portion 38 is perforated. The back portion 40 is preferably not perforated and is positioned aft of a forward edge 42 of the stowed blocker door 20. A honeycomb structure 44 is positioned between the back sheet 26 and the face sheet 36. The back sheet 26, face sheet 36 and honeycomb structure 44 are bonded together. They may be bonded by conventional high temperature cure means.

Figure 3:
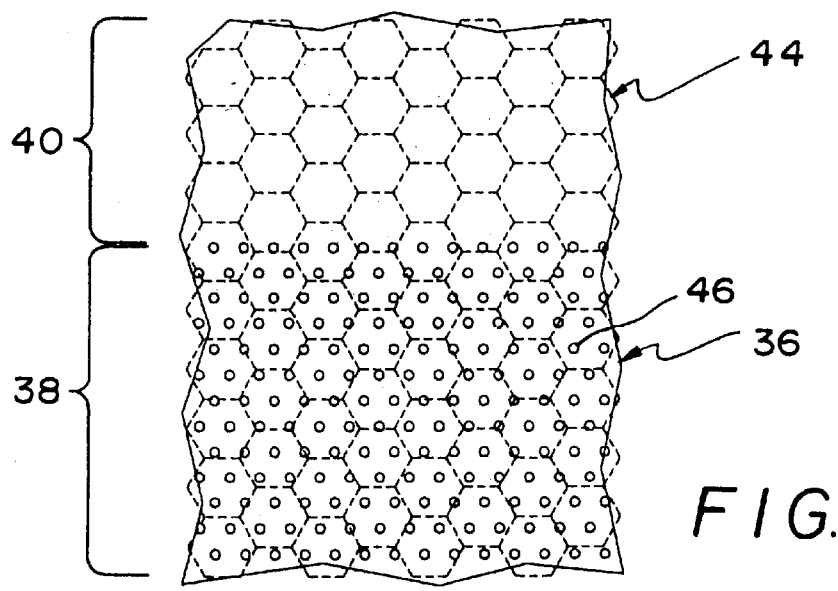
FIG. 3 is a view of the bullnose fairing assembly taken along line 3—3 of FIG. 2.
Figure 4:
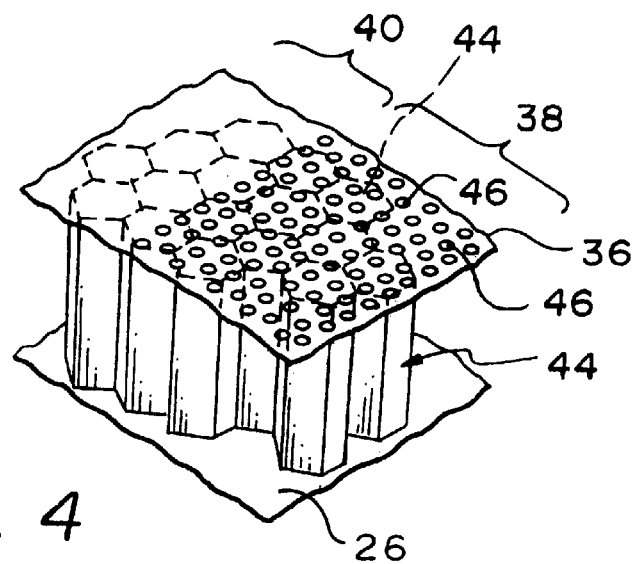
FIG. 4 is a fragmentary top perspective of the bullnose fairing assembly of the present invention.

FIGS. 3 and 4 illustrate a typical construction of the back sheet 26, face sheet 36 and honeycomb structure 44. The face sheet 36 and back sheet 26 may be fabricated of commonly used facing sheet materials such as aluminum sheet or laminated layers of polymide, epoxy glass, graphite epoxy and the like. The perforations 46 in the forward portion 38 are preferably in a range of about 0.040–0.050 inches. There is a percent open area, i.e. POA, in a range of about seven to fourteen percent. The perforations 46 set up an acoustic path to a closed cell structure that provides a resistance mechanism.

Figure 5:
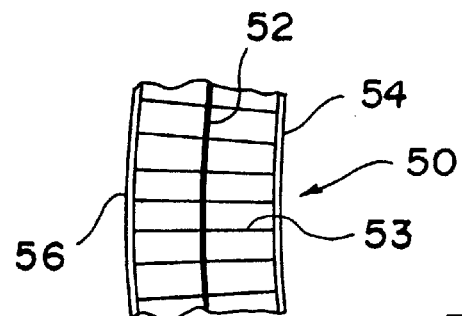
FIG. 5 is a fragmentary side view of an alternative embodiment of the bullnose fairing assembly, utilizing a septum.

The honeycomb structure 44 may have any commonly used honeycomb core designs such as flexcore, hexcore or the like with cell sizes of approximately 3/8 of an inch. It may be formed of typical honeycomb material such as aluminum, fiberglass or aramid paper/phenolic resin. The honeycomb structure 44 shown in FIG. 4 does not utilize a septum. FIG. 5 illustrates an alternative embodiment, designated generally as 50 that utilizes a septum 52 positioned in the honeycomb structure 53 between the face sheet 54 and the back sheet 56. The septum 52 is formed of sheet material. It is inserted at a predetermined distance below the face sheet 54 for attenuating high and medium frequency sound. The buried septum 52 is perforated and has a POA of approximately two percent with hole diameters of approximately 0.010 inches.

Referring again to FIG. 2, it can be seen that a row of aft fastening elements 45 fasten the back end 30 of the back sheet to a back end of the back portion 40 of the face sheet 36. The aft fastening elements 45 are securely affixed to an aft portion 47 of the outer fixed structure of the thrust reverser 12.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. An acoustically treated bullnose fairing assembly for a thrust reverser of an aircraft, the thrust reverser having an outer fixed structure and a stowable blocker door, comprising:
   a) a back sheet having a forward end and a back end;
   b) a face sheet having a forward portion and a back portion, said back portion being aft of a forward edge of a blocker door of a thrust reverser when the blocker door is in a stowed position, said forward portion being perforated; and
   c) a honeycomb structure positioned between said back sheet and said face sheet, wherein said back sheet, said face sheet and said honeycomb structure are bonded together and securely affixed to an outer fixed structure of the thrust reverser, and
   wherein said perforated forward portion of said face sheet cooperates with said honeycomb structure to maximize the acoustic performance of the thrust reverser.

2. The acoustically treated bullnose fairing assembly of claim 1, wherein said back sheet is affixed to the thrust reverser by a plurality of forward fastening elements for fastening said backsheet to a forward portion of an outer fixed structure of the thrust reverser.

3. The acoustically treated bullnose fairing assembly of claim 2, wherein said forward fastening elements comprise blind fasteners that do not extend through the bullnose fairing assembly to said face sheet.

4. The acoustically treated bullnose fairing assembly of claim 1, wherein said back sheet is affixed to the thrust reverser by a plurality of aft fastening elements for fastening a back end of the bullnose fairing assembly to an aft portion of the outer fixed structure of the thrust reverser.

5. The acoustically treated bullnose fairing assembly of claim 1, wherein said perforated forward portion of said face sheet has perforations in a range of about 0.040–0.050 inches.

6. The acoustically treated bullnose fairing assembly of claim 1, wherein said perforated forward portion of said face sheet has a percent open area (POA) in a range of about 7–14%.

7. The acoustically treated bullnose fairing assembly of claim 1, wherein said back portion of said face sheet is not perforated.

8. The acoustically treated bullnose fairing assembly of claim 1, wherein said face sheet is formed of aluminum sheet.

9. The acoustically treated bullnose fairing assembly of claim 1, wherein said face sheet is formed of epoxy glass.

10. The acoustically treated bullnose fairing assembly of claim 1, wherein said face sheet is formed of graphite epoxy.

11. The acoustically treated bullnose fairing assembly of claim 1, wherein said face sheet is formed of polymide.

12. The acoustically treated bullnose fairing assembly of claim 1, wherein said honeycomb structure comprises cells having sizes of approximately 3/8 of an inch.

13. The acoustically treated bullnose fairing assembly of claim 1, wherein said honeycomb structure is formed of aramid paper/phenolic resin.

14. The acoustically treated bullnose fairing assembly of claim 1, wherein said honeycomb structure includes a septum formed therein for attenuating high and medium frequency sound.

15. A thrust reverser assembly for an aircraft, comprising:
   a thrust reverser comprising an outer fixed structure and a stowable blocker door; and
   an acoustically treated bullnose fairing assembly attached to said thrust reverser, comprising:
   a) a back sheet having a forward end and a back end;
   b) a face sheet having a forward portion and a back portion, said back portion being aft of a forward edge of said stowable blocker door when said blocker door is stowed, said forward portion being perforated; and,
   c) a honeycomb structure positioned between said back sheet and said face sheet, wherein said back sheet, said face sheet and said honeycomb structure are bonded together and securely affixed to an outer fixed structure of the thrust reverser, and
   wherein said perforated forward portion of said face sheet cooperates with said honeycomb structure to maximize the acoustic performance of the thrust reverser.

16. The thrust reverser assembly of claim 15, wherein said back sheet is affixed to the thrust reverser by a plurality of forward fastening elements for fastening said backsheet to a forward portion of an outer fixed structure of the thrust reverser.

17. The thrust reverser assembly of claim 16, wherein said forward fastening elements comprise blind fasteners that do not extend through the bullnose fairing assembly to said face sheet.

18. The thrust reverser assembly of claim 15, wherein said back sheet is affixed to the thrust reverser by a plurality of aft fastening elements for fastening a back end of the bullnose fairing assembly to an aft portion of the outer fixed structure of the thrust reverser.

19. The thrust reverser assembly of claim 15, wherein said perforated forward portion of said face sheet has perforations in a range of about 0.040–0.050 inches.

20. The thrust reverser assembly of claim 15, wherein said perforated forward portion of said face sheet has a percent open area (POA) in a range of about 7–14%.

21. The thrust reverser assembly of claim 15, wherein said back portion of said face sheet is not perforated.

22. The thrust reverser assembly of claim 15, wherein said face sheet is formed of aluminum sheet.

23. The thrust reverser assembly of claim 15, wherein said face sheet is formed of epoxy glass.

24. The thrust reverser assembly of claim 15, wherein said face sheet is formed of graphite epoxy.

25. The thrust reverser assembly of claim 15, wherein said face sheet is formed of polymide.

26. The thrust reverser assembly of claim 15, wherein said honeycomb structure comprises cells having sizes of approximately 3/8 of an inch.

27. The thrust reverser assembly of claim 15, wherein said honeycomb structure is formed of aramid paper/phenolic resin.

28. The thrust reverser assembly of claim 15, wherein said honeycomb structure includes a septum formed therein for attenuating high and medium frequency sound.

29. An acoustically treated bullnose fairing assembly for a thrust reverser of an aircraft, the thrust reverser having an outer fixed structure and a stowable blocker door, comprising:

a) a backsheet having a forward end and a back end;

b) a plurality of forward fastening elements for fastening said backsheet to a forward portion of an outer fixed structure of a thrust reverser;

c) a face sheet having a forward portion and a back portion, said back portion being aft of a forward edge of a blocker door of the thrust reverser when said blocker door is in a stowed position, said forward portion being perforated;

d) a honeycomb structure positioned between said backsheet and said face sheet; and, e) a plurality of aft fastening elements for fastening said back end of said backsheet to a back end of said back portion of said face sheet, said aft fastening elements being securely affixed to an aft portion of the outer fixed structure of the thrust reverser, wherein said perforated forward portion of said face sheet cooperates with said honeycomb core structure to maximize the acoustic performance of the thrust reverser.

* * * * *